US005768959A

United States Patent [19]

Lorenzo

[11] Patent Number: 5,768,959

[45] Date of Patent: Jun. 23, 1998

[54] APPARATUS FOR FEEDING A WEB

[75] Inventor: John L. Lorenzo, Southbury, Conn.

[73] Assignee: Pitney Bowes Inc., Stamford, Conn.

[21] Appl. No.: 872,990

[22] Filed: Jun. 11, 1997

Related U.S. Application Data

[63] Continuation of Ser. No. 509,279, Jul. 31, 1995, abandoned.

[51] Int. Cl.$^{6}$ .............................. B23Q 15/00; B26D 5/00; B65H 20/00

[52] U.S. Cl. .................................... 83/74; 83/367; 83/408; 226/24; 226/111

[58] Field of Search .................................... 83/35, 47, 65, 83/72, 74, 75, 364, 365, 367, 408; 225/100; 226/24, 44, 111, 118

[56] References Cited

U.S. PATENT DOCUMENTS

| | | | |
|---|---|---|---|
| 2,214,593 | 9/1940 | Mustin et al. | 83/47 X |
| 3,556,510 | 1/1971 | Treff | 270/52 |
| 3,561,654 | 2/1971 | Greiner | 226/111 X |
| 4,534,253 | 8/1985 | Seragnoli | 83/367 X |
| 4,561,581 | 12/1985 | Kelly | 226/24 X |
| 4,593,893 | 6/1986 | Suter | 270/52.5 |
| 4,648,540 | 3/1987 | Steidel | 226/111 |
| 4,805,111 | 2/1989 | Steidel | 226/111 X |
| 4,898,094 | 2/1990 | Doumoto et al. | 226/111 X |
| 4,932,932 | 6/1990 | Schmidt et al. | 83/408 X |
| 4,972,743 | 11/1990 | Nojima | 83/367 X |
| 5,086,964 | 2/1992 | Blaser | 226/24 X |
| 5,104,104 | 4/1992 | Mol | 270/52.5 |
| 5,374,042 | 12/1994 | Ring | 270/52 |

*Primary Examiner*—Eugenia Jones

*Attorney, Agent, or Firm*—Angelo N. Chaclas; Melvin J. Scolnick

[57] ABSTRACT

Apparatus and method for feeding a web having two portions in a path of travel. The apparatus comprises a first module including a device for feeding the two web portions in side-by-side relationship and a second module located downstream in the path of travel from the first module where the second module includes a device for feeding the two web portions in upper-lower relationship. Accordingly, the two web portions each form a loop between the first module and the second module so as to reorient from side-by-side to upper-lower relationship. The apparatus further comprises a controller operatively connected to the first module feed a device and the second module feed a device for setting the feed speed of the first module feed a device corresponding to the feed speed of the second module feed device. The method includes the steps of: (a) determining the feed speed of the second module; and (b) setting the feed speed of the first module to a corresponding value for a given feed speed of the second module.

9 Claims, 7 Drawing Sheets

APPARATUS FOR FEEDING A WEB

CROSS REFERENCE TO THE RELATED APPLICATION

This application is a continuation of application Ser. No. 08/509,279, filed Jul. 31, 1995, now abandoned.

FIELD OF THE INVENTION

This invention relates to web feeding. More particularly, this invention is directed to a method and apparatus for sequentially and synchronously feeding a web from a first module that cuts the web into side-by-side portions to a second module where the web portions are introduced in “2-up” relationship.

BACKGROUND OF THE INVENTION

A web is a continuous stream of forms that are separated by transverse lines of weakening called perforations. Generally, having documents in web form versus individual separate documents increases throughput in various types of document handling equipment. Thus, many different types of document handling equipment, such as printers and inserter systems, have been adapted to accommodate webs.

Inserter systems are well known in the art and are generally used by organizations to facilitate producing a large volume of mailings. Often times, the input to the inserter system is a web of computer generated and printed documents where each document contains information that is intended for a particular addressee. It is the function of the inserter system to accept the web and produce the individual mailings that correspond to each document. To accomplish this, the typical inserter includes a variety of modules for performing different tasks, such as: various web handling modules (slitters, cutters and bursters) for separating the continuous forms into singular or discrete documents, an accumulator module for assembling discrete documents into a collation, a folder module for folding the collation into a desired configuration (Z-fold, C-fold, half fold), feeder modules for adding sheets to the collation, and an insert station module for inserting the collation into an envelope.

Although such prior art systems as described above generally perform well, problems exist when handling certain types of webs in some applications. Some webs are comprised of forms that are approximately 11 by 18 inches in dimension and are joined along their major length to form the web of continuous forms. Thus, the major length of the forms is transverse to the longitudinal dimension of the web. Accordingly, this allows a computer printer to create two 8.5 by 11 inch printouts or documents sideby-side on each web form. Inserter systems incorporate an upstream web slitter module to cut the web along its longitudinal center line so as to create two side-by-side web portions. In this instance, each side-by-side web portion contains 8.5 by 11 inch forms that are joined along their minor length. Once the web has been slit along its center line, the next downstream operation is typically to separate the now smaller web forms into discrete documents. To achieve this, either a burster module or a cutter module is used. The burster module separates the forms by tearing them off from one another along the perforations. Thus, the perforations assist the bursting operation. In contrast, the cutter module separates the forms from one another by cutting along or near the perforations without assistance from the perforations. Although slitting the web to create side-by-side web portions is relatively easy, interfacing the two web portions with the adjacent downstream module of the inserter, whether it is a burster module or a cutter module, presents difficulties.

Most burster modules and cutter modules accept two web portions in what is commonly referred to as “2-up” orientation. In this arrangement, two web streams are feed into the burster or cutter module in upper-lower relationship, i.e. one web portion over the other web portion. This is in direct contrast to the side-by-side relationship of the two web portions as they exit the slitter module. Thus, operational difficulties are created when interfacing the slitter module to an adjacent downstream burster or cutter module. As the two web portions emerge from the slitter module, the two portions are first separated and then directed so as to bring one portion over the other. Because the two portions are difficult to handle, a long length of web is required to accomplish this reorientation and thus the slitter module must be sufficiently spaced apart from the downstream module. Thus, long loops are formed by the two portions between the slitter module and the downstream module. Because the loops are originally in side-by-side relationship and then reorient to upper-lower relationship, the loops take on a slight twist or ribbon shape.

These loops are difficult to handle and often cause jams or web breakages for several reasons. First, the two loops have a tendency to swing and bump into each other when the slitter module and downstream module are operating. This increases the risk of the loops becoming tangled or even breaking along a perforation line. Second, since each loop has a twist in it, the tension on the sides of each loop is not uniform. Thus, when the downstream module feeds a web portion the risk of breaking along a perforation line increases here as well. This problem is made worse by the fact that the “2-up” burster and cutter modules typically feed each of the two web portions in alternating fashion. Depending upon how the individual forms that make up the web portions are to be accumulated, the downstream module selectively feeds and then bursts or cuts, as the case may be, along the perforation line. Accordingly, feeding of the web portions is not continuous which causes jerks on the web portions due to the quick stop and start feeding of the downstream module. Correspondingly, the slitter module must also stop and start feeding the web to maintain proper shape of the loops of the two web portions.

Some prior art systems have attempted to resolve these problems by utilizing rollers, guides, deflectors, and other mechanical structure to isolate the loops from each other so as to minimize their crashing into each other. However, such systems do not address reducing the jerking on the loops due to the stop and start feeding of the downstream and slitter modules.

Other prior art systems have relied solely on a sensor located at the slitter module to detect the presence or absence of one of the loops of a particular web portion. These systems cause the slitter module to feed when the sensor indicates the loop is not present and stop feeding when the sensor indicates the loop is present. This arrangement creates extended periods of time where the downstream module is feeding and the slitter module is not, and vice versa. The feeding of the downstream module and the slitter module are uncoordinated. The result is repetitious tightening and then slackening of the loops which induces them to swing and bump into each other.

Therefore, there is a need for a method and apparatus for sequentially and synchronously feeding a web from a first module that cuts the web into side-by-side portions to a second module where the web portions are introduced in upper-lower relationship so as to reduce the jerking on the loops.

SUMMARY OF THE INVENTION

Accordingly, it is an object of the present invention to reduce the jerking effects on the web when feeding the web between the first module and the downstream module.

In accomplishing this and other objects there is provided a method and apparatus for feeding a web having two portions in a path of travel. The apparatus comprises a first module including means for feeding the two web portions in side-by-side relationship and a second module located downstream in the path of travel from the first module where the second module includes means for feeding the two web portions in upper-lower relationship. Accordingly, the two web portions each form a loop between the first module and the second module so as to reorient from side-by-side to upper-lower relationship. The apparatus further comprises control means operatively connected to the first module feed means and the second module feed means for setting the feed speed of the first module feed means corresponding to the feed speed of the second module feed means. The method includes the steps of: (a) determining the feed speed of the second module; and (b) setting the feed speed of the first module to a corresponding value for a given feed speed of the second module.

Therefore, it is now apparent that the invention achieves all the above objects and advantages. Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention. As shown throughout the drawings, like reference numerals designate like or corresponding parts.

DETAILED DESCRIPTION OF THE PREFERRED EMBODIMENT

Figure 1:
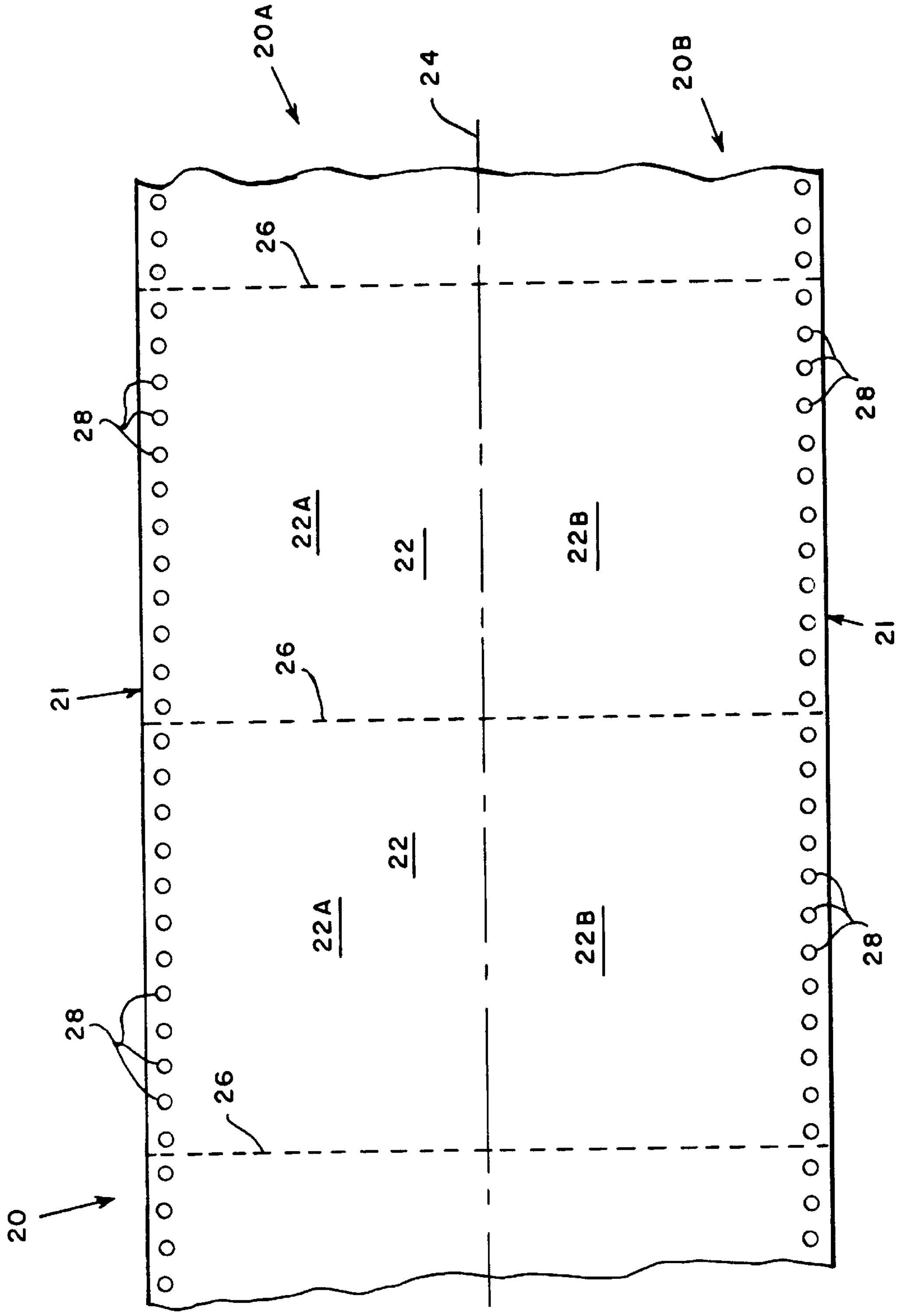
FIG. 1 is a plan view of a typical web which may be used in accordance with the present invention.

Referring to FIG. 1, an elongated web 20, of the type which may be used in accordance with the present invention, is shown. The web 20 has a pair of parallel and longitudinally extending side edges 21. The web 20 comprises a plurality of continuous and successive uniformly dimensioned forms 22 which are joined along their major length at perforated lines of weakening 26. Running along each side 21 of the web 20 are a plurality of sprocket holes 28. Each form 22 includes two printout sections 22A and 22B which are created when the web 20 is split along its center line 24. When the web 20 is split in this manner two separate web portions 20A and 20B are formed. In some applications, perforated lines of weakening may also be provided running parallel to the sides 21 and closely adjacent to the plurality of sprocket holes 28. However, these perforated lines of weakening have no bearing on the practice of the present invention.

Typically, each form 22 is 11 inches in the longitudinally direction (i.e., between the perforated lines of weakening 26) and approximately 18 inches in the transverse direction (i.e., between the web sides 21). This arrangement allows for the form 22 to be split into two equal sections along center line 24 and then have the side edges 21 stripped so as to yield two 8.5 by 11 inch sheets per form 22. Although these dimensions are provided for the typical form 22, it is conceivable that other dimensions could be utilized without departing from the spirit and scope of the present invention.

Figure 2:
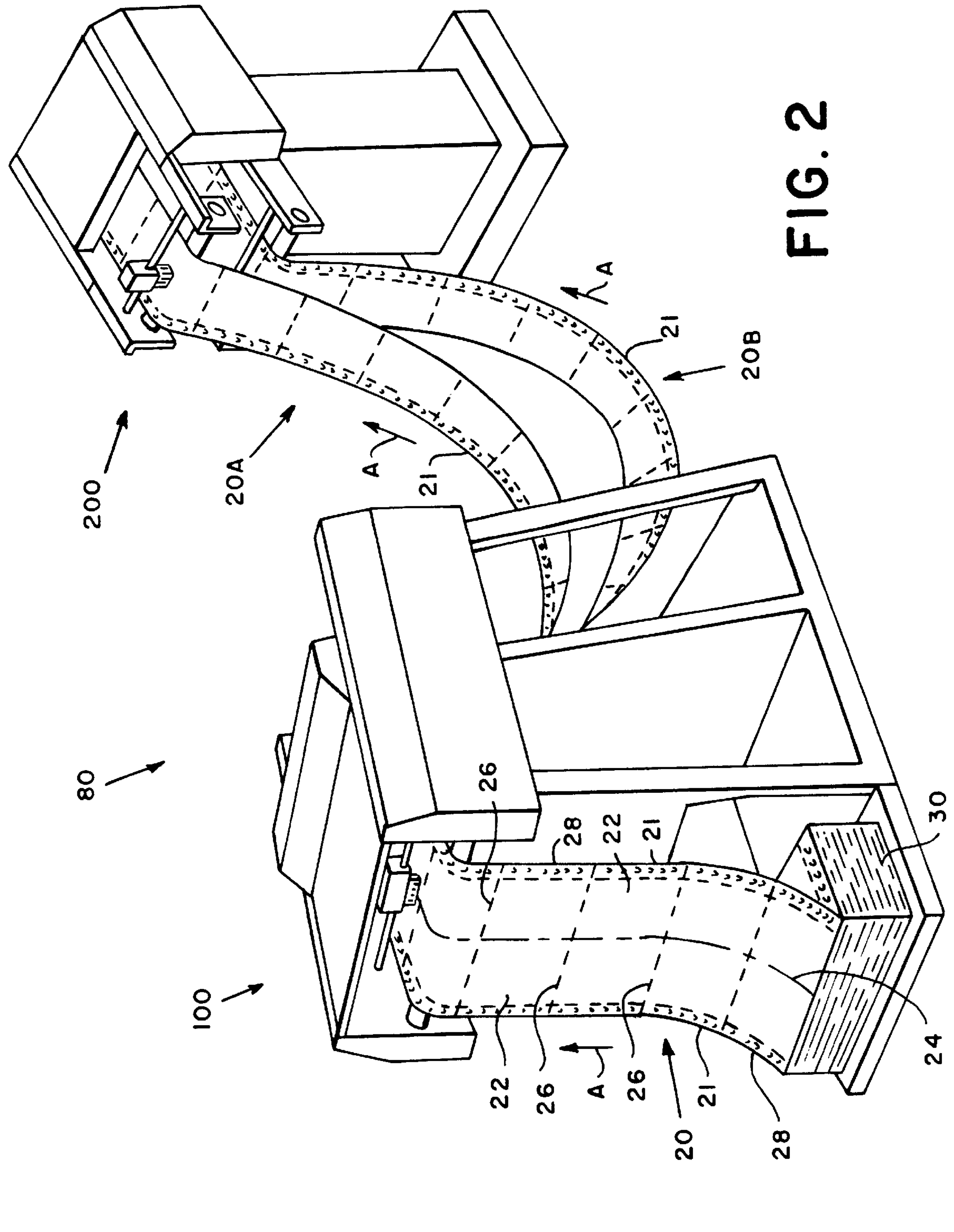
FIG. 2 is a schematic perspective view of a web processing apparatus having a first upstream module and a second downstream module in which the present invention may be used.

Referring to FIG. 2, apparatus 80 is provided for processing a web 20 of forms 22. The apparatus 80 includes a slitter module 100 for cutting the elongate web 20 along its center line 24. This results in the slitter module 100 outputting two web portions 20A and 20B. The web portions 20A and 20B are initially separated and then brought over each other so as to feed directly into cutter module 200 in upper-lower or over-under relationship. It should be noted, that the web portions 20A and 20B only have sprocket holes on one side after slitting. Due to the difficulties of reorienting the web portions 20A and 20B from side-by-side to upper-lower relationship, it is necessary to have the slitter module 100 and the cutter module 200 sufficiently spaced apart to achieve the transition in the web portions 20A and 20B. Accordingly, long loops are formed in the web portions 20A and 20B to gradually accommodate the change in relative positions.

Figure 3:
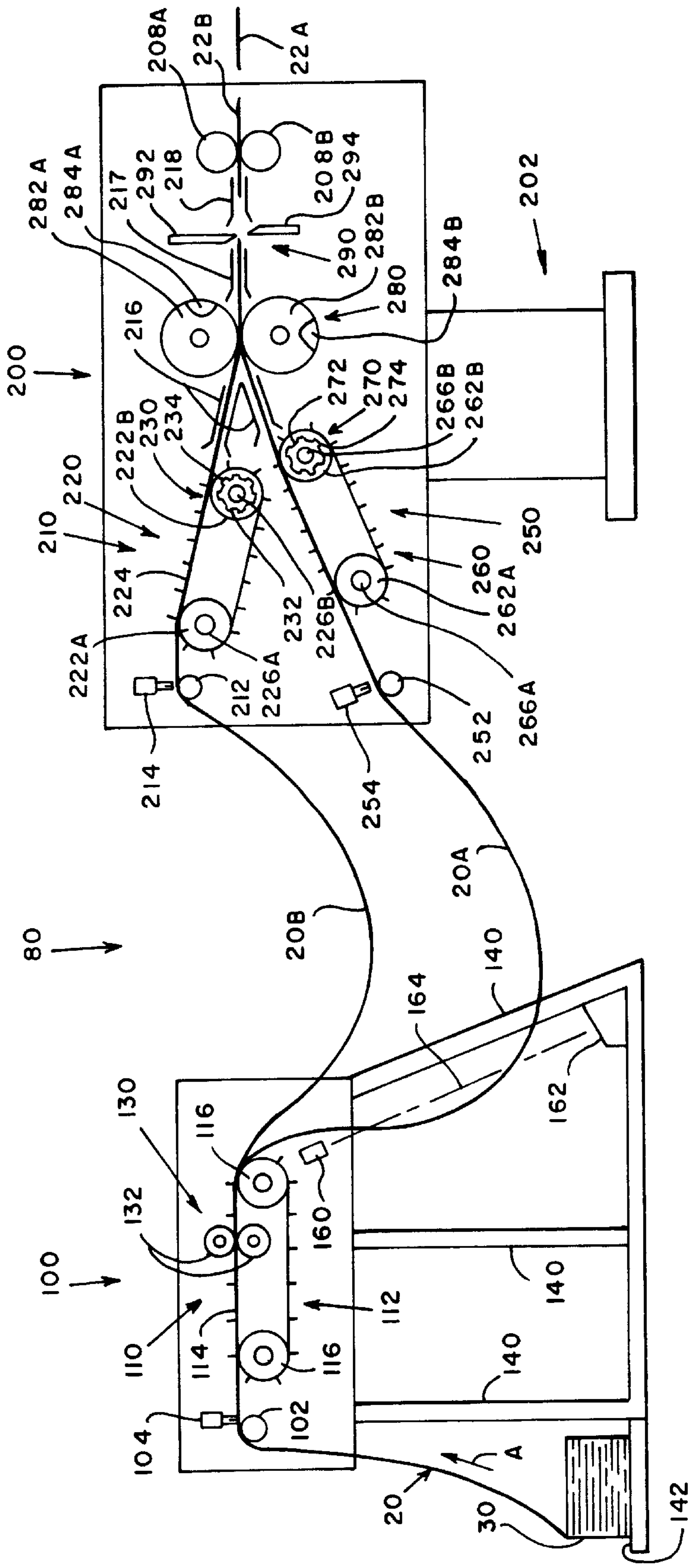
FIG. 3 is a schematic elevational view of the web processing apparatus as shown in FIG. 2.
Figure 4:
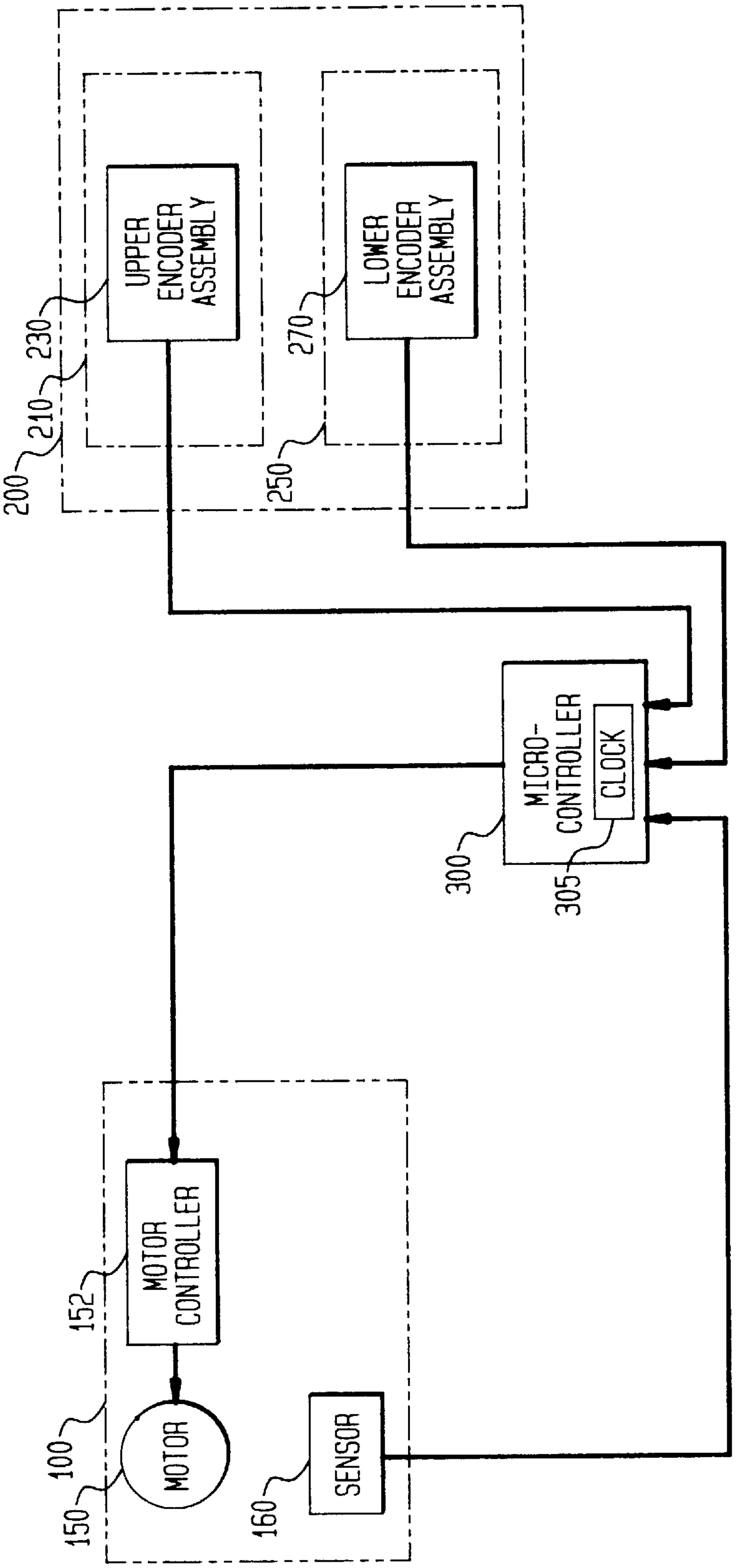
FIG. 4 is a block diagram of a control system in accordance with the present invention.

Referring to FIGS. 3 and 4, a more detailed view of the apparatus 80 is provided. The slitter module 100 includes a web feeding assembly 110 and a cutting assembly 130 which are supported by a plurality of legs 140. Extending outward from the legs 140 is a shelf 142 for supporting the web 20 in a fan folded stack 30. However, the web 20 may also be supplied in roll form. The web 20 is fed into the slitter module 100 between guide bar 102 and brush 104 which are conventionally mounted to the slitter module 100 by any suitable means. The web feed assembly 110 conveys the web in a downstream path of travel as indicated by arrow A. The web feed assembly 110 includes a tractor system 112 comprising an endless sprocket belt 114 extending between pulleys 116. The pulleys 116 are operatively connected to a motor 150 which is under the control of a motor controller 152. The cutting assembly 130 includes opposed rotating cutting wheels 132 which are located in the path of travel along the center line 24 of the web 20. The cutting wheels 132 cut the web 20 into two distinct separate web portions 20A and 20B as the web feed assembly 110 advances the web 20. The cutting wheels 132 are conventionally rotatably connected to the slitter module 100 by any suitable means.

The slitter module 100 also includes a reflective optical sensor 160 and a reflector 162. The sensor 160 is mounted to the slitter module 100 adjacent to the output end of the slitter module 100 near the web feed assembly 110. The reflector 162 is mounted to the legs 140 at the base the slitter module 100. The sensor 160 and the reflector 162 are aligned such that a beam of light 164 originating from the sensor 160 is directed to the reflector 162 and then reflected back to the sensor 160. Further, the sensor 160 and the reflector 162 are positioned so as to detect the presence of the loop formed by web portion 20A. When the light beam 164 is reflected back from reflector 162 and reaches the sensor 160, then the web portion 20A is not present. Conversely, when the light beam 164 is not reflected back to the sensor 160, then the web portion 20A is present. Moreover, if the sensor 160 is blocked, then the loop is generally properly formed. On the other hand, if the sensor 160 is unblocked, then the loop is not properly formed because it has been pulled too taut.

Downstream from the slitter module 100 is a cutter module 200 which includes an upper feed assembly 210, a lower feed assembly 250, and a cutting assembly 290. The cutter module 200 is a "two-up" type of cutter module which receives two separate web streams in upper-lower relationship. Therefore, it is important that the cutter module 200 is sufficiently spaced downstream from the slitter module 100 to allow the web portions 20A and 20B to reorient from side-by-side relationship to upper-lower relationship. Accordingly, long loops are formed by the web portions 20A and 20B to gradually achieve this transition without causing any damage.

The upper feed assembly 210 includes a guide bar 212 and brush 214 which are conventionally mounted to the cutter module 200 by any suitable means for directing the web portion 20B to a tractor feed assembly 220. Since the web portion 20B only has sprocket holes 28 on one side, only one tractor feed assembly 220 is required. The tractor feed assembly 220 includes a pair of pulleys 222A and 222B which are fixably mounted to shafts 226A and 226B respectively. An endless sprocket belt 224 is disposed between the pulleys 222A and 222B. The cutter module 200 includes suitable structure (not shown) for rotatably mounting shafts 226A and 226B by any conventional means. Shaft 226B is operatively coupled to a motor (not shown) for causing the shaft 226B to rotate. Thus, as the shaft 226B rotates, the belt 224 advances in corresponding fashion so that the sprockets engage the holes 28 on the web portion 20B.

Additionally, an encoder assembly 230 is coupled to the shaft 226B. The encoder assembly 230 includes a plurality of slots 232 and vanes 234 that rotate along with the shaft 226B for alternately blocking and unblocking a sensor (not shown). The encoder assembly 230 allows for determining the rotational position, velocity and acceleration of the shaft 226B by evaluating the encoder pulses which are transitions from blocked to unblocked and vice versa. Encoder technology is well known in the art and a wide variety of different encoders could serve appropriately when practicing the invention. The selection of the particular encoder assembly is a matter of design choice and is not of consequence when practicing the invention.

The lower feed assembly 250 includes a guide bar 252 and brush 254 which are conventionally mounted to the cutter module 200 by any suitable means for directing the web portion 20A to a tractor feed assembly 260. Since the web portion 20A only has sprocket holes 28 on one side, only one tractor feed assembly 260 is required. The tractor feed assembly 260 includes a pair of pulleys 262A and 262B which are fixably mounted to shafts 266A and 266B respectively. An endless sprocket belt 264 is disposed between the pulleys 262A and 262B. The cutter module 210 includes suitable structure (not shown) for rotatably mounting shafts 266A and 266B by any conventional means. Shaft 266B is operatively coupled to a motor (not shown) for causing the shaft 266B to rotate. Thus, as the shaft 266B rotates, the belt 264 advances in corresponding fashion so that the sprockets engage the holes 28 on the web portion 20A.

Additionally, an encoder assembly 270 is coupled to the shaft 266B. The encoder assembly 270 includes a plurality of slots 272 and vanes 274 that rotate along with the shaft 266B for alternately blocking and unblocking a sensor (not shown). The encoder assembly 270 allows for determining the rotational position, velocity and acceleration of the shaft 266B by evaluating the encoder pulses which are transitions from blocked to unblocked and vice versa. Encoder technology is well known in the art and a wide variety of different encoders could serve appropriately when practicing the invention. The selection of the particular encoder assembly is a matter of design choice and is not of consequence when practicing the invention.

Downstream from the tractor feed assemblies 210 and 260, the web portions 20A and 20B are directed by guides 216 into overlapping relationship at trimmer assembly 280. Trimmer assembly 280 includes two pairs of counter rotating cutting disks 282A and 282B, and 284A and 284B, respectively. The cutting discs 282A and 282B work in cooperation to trim the sprocket holes 28 from web portion 20B while cutting discs 284A and 284B work in similar fashion to trim the sprocket holes 28 from web portion 20A.

The web portions 20A and 20B are fed past a cutting assembly 290 to takeaway rollers 208A and 208B which are operatively connected to a motor (not shown) for driving the rollers 208A and 208B. The nip between rollers 208A and 208B is a positive nip that keeps accurate control of the web portions 20A and 20B, respectively. The takeaway motor works in cooperation with the upper drive assembly motor and the lower feed assembly motor, respectively, for maintaining control of the advancing web portions 20A and 20B, respectively. It is important that the pairs of cutting disks 282A and 282B, and 284A and 284B, not exert too much pressure on the web portions 20A and 20B so as to allow them to slip past each other during feeding. In this manner, it is possible to advance either web portion 20A or web portion 20B past the cutting assembly 290 to the takeaway rollers 208A and 208B. Guides 217 and 218 direct the web portions 20A and 20B to the takeaway rollers 208A and 208B by controlling the lead edge of the advancing web portion.

The cutting assembly 290 includes a knife 292 and a corresponding anvil 294. In the resting position, the knife 292 is disposed on one side of the web portions 20A and 20B while the anvil 294 is disposed on the opposite side. In respective fashion, the web portions 20A and 20B are fed past the cutting knife 292 until they are properly positioned such that the perforation lines 26 are directly beneath the knife 292. At this point, feeding is stopped and the knife assembly is actuated so that the knife 292 and the anvil 294 cut or shear the forms 22A or 22B, respectively, from the remainder of the web portions 20A or 20B. Thus, the cutter module 200 outputs individual documents or sheets 22A and 22B in alternating sequence. Those skilled in the art will recognize that other sequences are also possible from the cutter module 200. For example, it is possible to feed two forms from web 20B and then two forms from 20A in alternating sequence instead of just one form from each web portion 20A and 20B in alternating sequence.

Referring to FIG. 4, a microcontroller 300 is shown in operative communication with the slitter module 100 and the cutter module 200. The exact location of the microcontroller 300 is merely a matter of design choice. It is possible to locate the microcontroller 300 anywhere within apparatus 80. In the preferred embodiment the microcontroller is located within the slitter module 100. The microcontroller 300 is in communication with the upper feed assembly 210 via the shaft encoder 230. In similar fashion, the microcontroller 300 is also in communication with the lower feed assembly 250 via the shaft encoder 270. In this manner, the microcontroller 300 monitors the pulses which are output by the shaft encoders 230 and 270, respectively. Thus, by monitoring the shaft encoders 230 and 270, the microcontroller 300 can determine the speed at which the cutter module 200 is feeding. In the slitter module 100, the microcontroller is in communication with sensor 160 to monitor whether the sensor is blocked or unblocked and motor controller 152. Therefore, it should now be understood that the microcontroller 300 receives as inputs signals from: sensor 160, shaft encoder 230 and shaft encoder 270. From these inputs, the microcontroller 300 develops output signals which are fed to the motor controller 152 in the slitter module 100. Thus, the microcontroller 300 controls the feeding of the web 20 in the slitter module 100 depending upon the operation of the cutter module 200. It should now be apparent to those skilled in the art that with the microcontroller 300 in communication with both the slitter module 100 and the cutter module 200 that feeding of the web portions 20A and 20B can be synchronized to reduce jerking on the long loops formed by web portions 20A and 20B.

Figure 5:
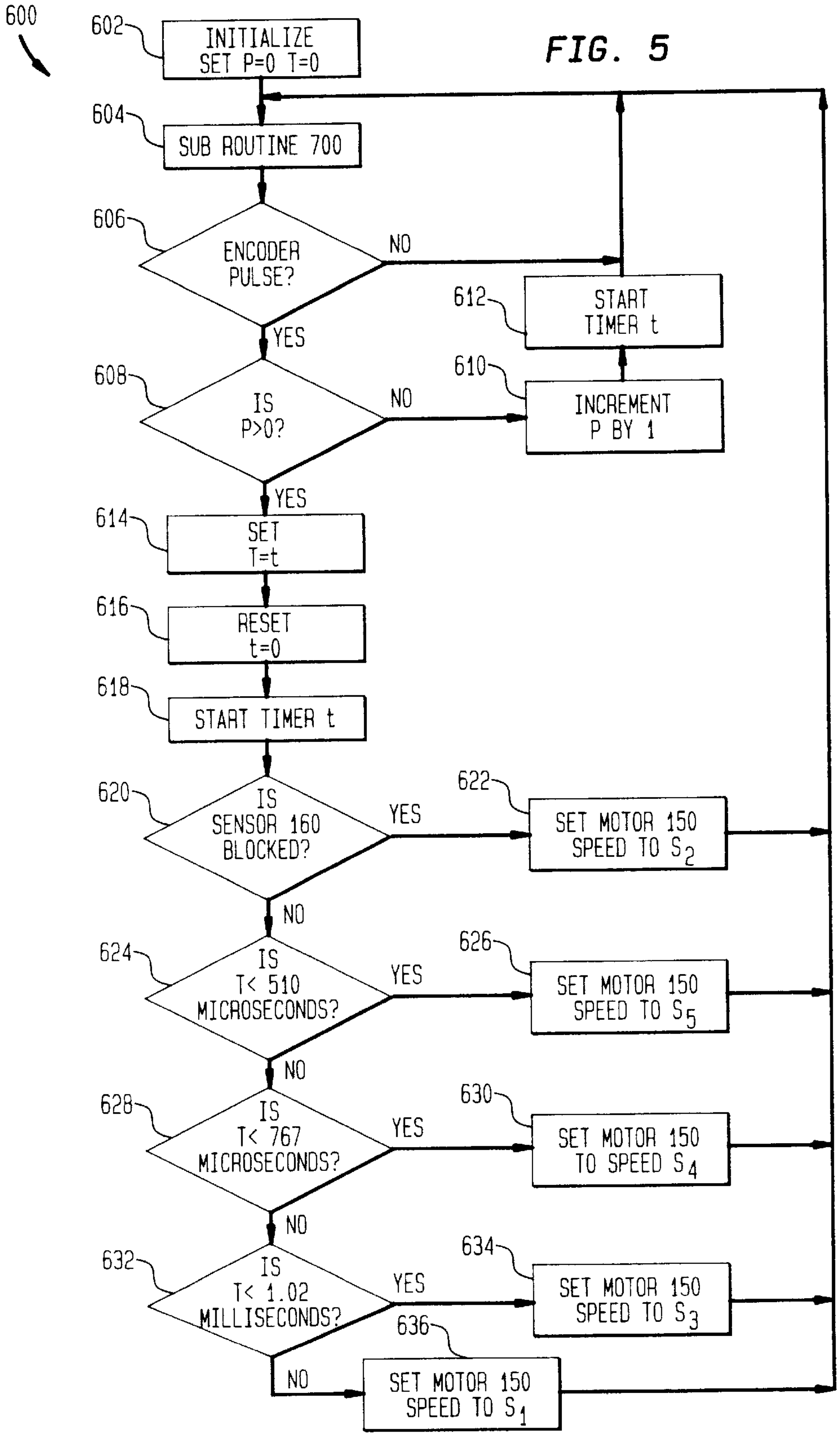
FIG. 5 is a flow chart of a routine which sets the feed speed of the first module depending upon the feed speed of the second module in accordance with the present invention.
Figure 6:
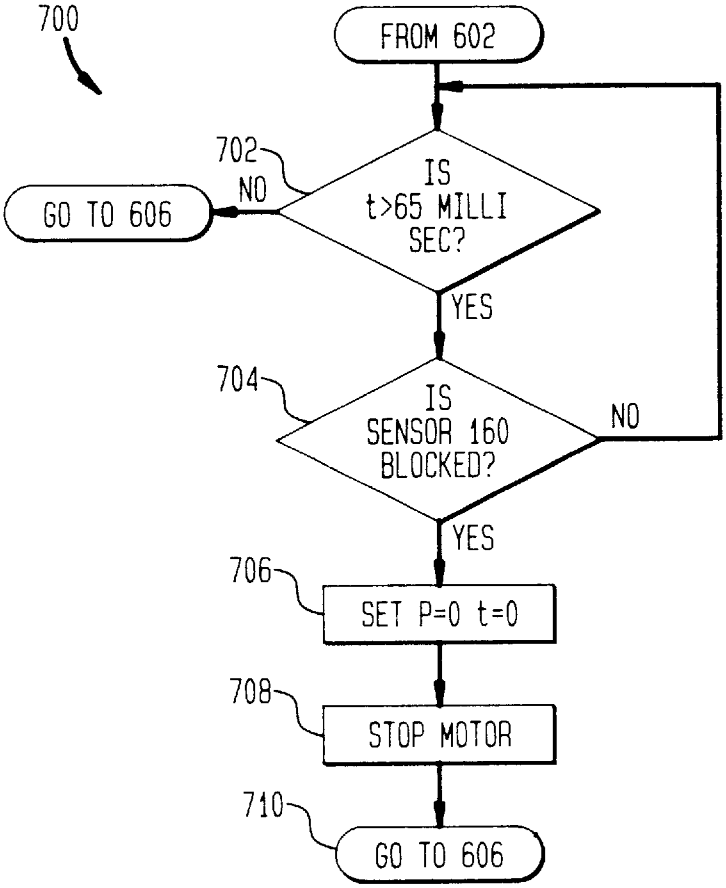
FIG. 6 is a flow chart of a subroutine which is internal to the routine of FIG. 5 in accordance with the present invention.

Referring to FIGS. 5 and 6, a flowchart which describes synchronously feeding the web portions 20A and 20B between the slitter module 100 and the cutter module 200 is shown. Routine 600 and its internal subroutine 700, which may be implemented in the microprocessor 300 in either software or hardware, are shown which control feeding of the web portions 20A and 20B. The microprocessor 300 includes an internal clock 305 and executes the routine 600 for each clock cycle. At 602, the routine 600 is initialized during system power-up and variables pulse count P and time count t are set to zero. At 604, the procedure calls subroutine 700 which will be described in detail below. At 606, the microprocessor 300 monitors to see if an encoder pulse has been received. An encoder pulse from either the upper feed assembly shaft encoder 230 or the lower feed assembly shaft encoder 270 in the cutter module 200 will cause the microprocessor to register an encoder pulse. If no encoder pulse is received, then the procedure returns control to 604. On the other hand, if an encoder pulse is received, then at 608, a determination is made as to whether the pulse count P is greater than zero. If P is not greater than zero, then, at 610, P is incremented by one. Next at 612, the time count t is started before returning control of the procedure back to block 604. Thus, it should now be apparent that at least one encoder pulse must be received before the procedure 600 can advance past 608. If at 608, the pulse count P is greater than zero, then at 614 a variable T is set equal to the time count t. Next, at 616, the time count t is reset to zero. Then, at 618, the time count t is started again. It should now be apparent to those skilled in the art that time count t provides a means for keeping track of the time elapsed between successive pulse counts. At 620, the procedure 600 checks to see if sensor 160 is blocked or unblocked. If the sensor 160 is blocked, then at 622 the speed of motor 150 is set to a constant S2. From here, control is returned to block 604. Thus, it should be apparent to those in the art that in this instance, the web portions 20A is still properly looped because it is blocking the sensor 160, however, the cutter module 200 has begun to feed the web portions 20A or 20B, respectively, and thus will be reducing the amount of slack between the slitter module 100 and the cutter module 200. Therefore, the slitter module 200 needs to feed the web 20, but not necessarily at a high rate of speed. In the alternative, if at 620 the sensor 160 is not blocked, then the routine 600 proceeds to make a determination as to how fast the cutter module 200 is feeding the web portions 20A and 20B by evaluating the length of time between encoder pulses. The faster the cutter module 200 is feeding the shorter the time between encoder pulses will be. At 624, a determination is made as to whether the variable T is less than 510 microseconds. If T is less than 510 microseconds, then at 626 the motor 150 is set to speed S5. S5 represents that highest speed that the slitter module 100 will be set to. Since the loop is not present it is being pulled taut and at the same time the cutter module 200 is feeding very fast. Therefore, there is a need to feed the web 20 from the slitter module 100 at a high rate of speed. From here, control is returned to 604. If on the other hand at 624 T is not less than 510microseconds, then at 628 a determination is made whether T is less than 767 microseconds. If T is less than 767 microseconds, then at 630 the motor 150 speed is set to a constant S4. From here control is returned to 604. On the other hand if at 628 T is not less than 767 microseconds, then at 632 a determination is made whether T is less than 1.02 milliseconds. If T is less than 1.02 milliseconds, then at 634, the motor 150 speed is set to a constant S3. From here, control is returned to 604. On the other hand, if at 632 T is not less than 1.02 milliseconds, then at 636, the speed of motor 150 is set to S1. Next, control is returned to 604.

At 604, subroutine 700 is called. At 702, a determination is made whether t is greater than 65 milliseconds. If t is not greater than 65 milliseconds, then control is returned to 606. However, if t is greater than 65 milliseconds, then at 704 a determination is made whether sensor 160 is blocked. If sensor 160 is not blocked, then control returns to 702. On the other hand, if sensor 160 is blocked, then at 706, the pulse count P is set to zero and the timer count t is set to zero. Next, at 708, the motor 150 is instructed to stop. Then, at 710, control is returned to 606. Thus, it should now be apparent to those skilled in the art that subroutine 700 behaves as a time-out interrupt that looks for the last encoder pulse before a long idle period in the cutter module 200.

It should be understood by those skilled in the art that since the microprocessor clock speed is much faster than the rate at which the encoder pulses occur, the motor 150 speed may not change for each microprocessor clock cycle. However, the relative high rate of the microprocessor clock speed as compared to the encoder pulses assures almost continuous monitoring or sampling of the overall system which achieves a sufficient feed back and control system.

It is important that motor speeds S1, S2, S3, S4, and S5 are selected to ensure proper synchronous feeding of the slitter module 100 with the cutter module 200. In the preferred embodiment, five different speeds have been selected, however, it would be equally feasible to divide the range of speeds into any other number. S5 represents the fastest speed setting while S1 represents the slowest speed setting. Accordingly, S2, S3 and S4 represent intermediate values of increasing speed between S1 and S5. The fastest speed, S5, is selected when the time between encoder pulses is the smallest. Therefore, when the cutter module 100 is feeding fast, the slitter module 100 is feeding correspondingly fast. In analogous fashion, when the time between successive encoder pulses is great (T is greater than 1.02 milliseconds), then the motor 150 speed is set to S1. This ensures that when the cutter module 200 is feeding slowly that the slitter module 100 is feeding correspondingly slowly. Thus, by matching speeds between the cutter module 200 and slitter module 100, the jerking effects on the web portions 20A and 20B are greatly reduced. Because the web portions 20A and 20B now feed more smoothly between the slitter module 100 and the cutter module 200, the likelihood of breakage along the perforation lines 26 is greatly reduced. This leads to increased up time and the need for less operator intervention to fix jams and web breakages.

Figure 7A:
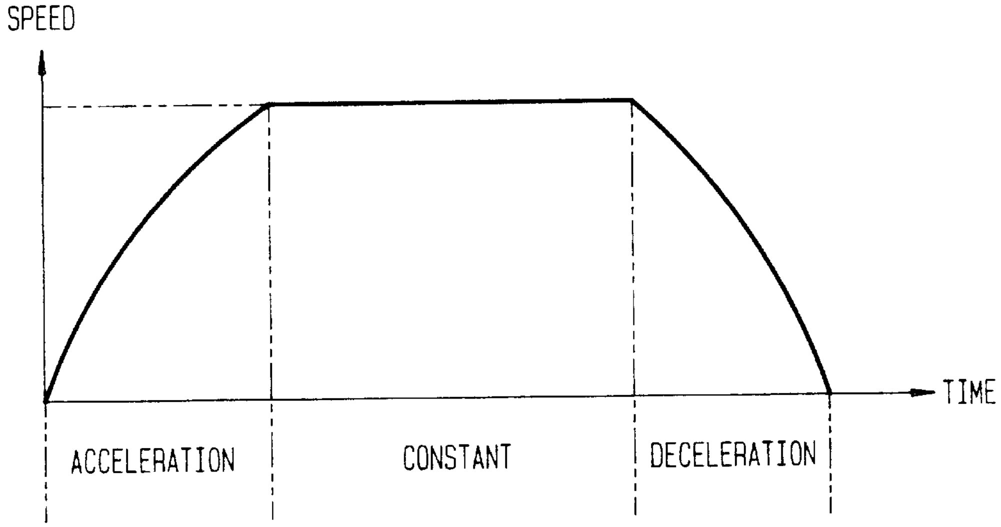
FIG. 7A is a diagrammatic view of the feed speed for the second module during one cycle of operation in accordance with the present invention.
Figure 7B:
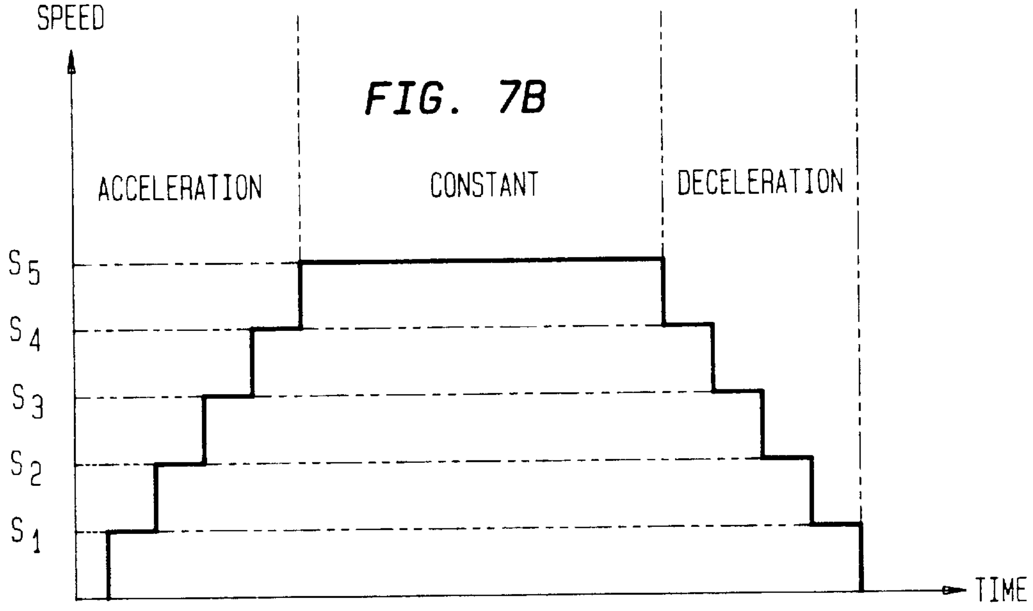
FIG. 7B is a diagrammatic view of the feed speed for the first module during one cycle of operation in accordance with the present invention.

Referring to FIGS. 7A and 7B, a graph of the feed speed profile for one cycle in the cutter module 200 and slitter module 100 are shown, respectively. The shape of the these profiles is not intended as an exact representation, but only to serve as a means for discussing the problem that the invention is directed towards. Both the upper and lower feed assemblies 210 and 250 will generate a feed speed profile of the kind shown in FIG. 7A. The cutter feed speed profile typically has three phases: an acceleration phase of increasing feed speed, a constant phase of steady feed speed and a deceleration phase of decreasing feed speed. The exact shapes of the cutter feed speed profile will depend on the particular requirements of each installation. As discussed above, the microprocessor 300 in communication with the slitter module 100 will sample the cutter feed speed profile many times during one feed cycle. In response, the present invention will produce a feed profile in slitter module 100 as shown in FIG. 7B with corresponding acceleration, constant and deceleration phases. In the preferred embodiment, for a cutter module 200 with a top feed speed of 120 inches per second which is processing web portions 20A and 20B that contain forms which are 8.5 by 11 inches long, S5 is set to 75 inches per second, S4 is set to 60 inches per second, S3 is set to 45 inches per second, S2 is set to 30 inches per second, and S1 is set to 15 inches per second. Those skilled in the art will recognize that the top speed S5 of the slitter module 100 is set to just over one half (½) the top speed of the cutter module 200. This is due to the fact that the cutter module 200 must feed from either web portion 20A or web portion 20B one at a time while the slitter module 100 feeds both web portions 20A and 20B at the same time.

It should be apparent to those skilled in the art that the present invention provides an effective feedback and control system that will adapt to however the slitter module 200 is configured. As a result, if the feed speed profile of the slitter module 200 changes, for example because of using a different web having forms with different dimensions than the described above, the present invention will accommodate such changes automatically.

Many features of the preferred embodiment represent design choices selected to best exploit the inventive concept as implemented in an inserter system with a cutter module downstream from the slitter module. However, the present invention is equally applicable to situation where the downstream module is a burster. Additionally, in its broader aspects the invention may be employed in any web handling apparatus where two web streams are reoriented from side-by-side relationship to upper-lower relationship necessitating long loops formed by the web streams.

Moreover, additional advantages and modifications will readily occur to those skilled in the art. For example, more sophisticated encoder assemblies may be selected to provide matching of not only feed speeds but also accelerations. Another simple modification would be to place the encoder assembly on the tractor drive motors instead of the pulley shafts. Still another example is repositioning sensor 160 and reflector 162 toward the inside of a loop to detect when the loop is pulled too taut as opposed to the arrangement in the preferred embodiment. Therefore, the invention in its broader aspects is not limited to the specific details of the preferred embodiment. Accordingly, various modifications may be made without departing from the spirit of the general inventive concept as defined by the appended claims and their equivalents.

What is claimed is:

1. Apparatus for feeding a web having two portions in a path of travel, comprising:

a first module including means for feeding the two web portions in side-by-side relationship;

a second module located downstream in the path of travel from said first module, said second module including means for feeding the two web portions in upper-lower relationship where the two web portions each form a loop between said first module and said second module so as to reorient from side-by-side to upper-lower relationship;

sensor means for detecting the presence of one of the two web portion loops; and control means including means operatively connected to said second module for determining the feed speed of said second module feed means, said control means operatively connected to said sensor means and said second module feed means for setting the feed speed of said first module feed means corresponding to the feed speed of said second module feed means, said determining means including encoder means for providing a plurality of encoder pluses indicative of the feed speed of said second module feed means;

said control means further for measuring an interval of time between successive encoder pulses;

wherein, for a first time interval within a first predetermined range of intervals, said control means sets the feed speed of said first module to a first corresponding value if the one loop is present and to a second corresponding value if the one loop in not present; and for a second time interval within a second predetermined range of intervals different from said first predetermined range of intervals, said control means sets the feed speed of said first module to said first corresponding value if the one loop is present and to a third corresponding value different from said second corresponding value if the one loop is not present.

2. The apparatus of claim 1, wherein: said control means includes a microprocessor having an internal clock and said determining means evaluates the feed speed of said second module for each clock cycle.

3. The apparatus of claim 2, wherein:

said second corresponding value is greater than said first corresponding value.

4. The apparatus of claim 3, wherein:

said apparatus is an inserter and said first module is a slitter module.

5. The apparatus of claim 4, wherein:

said second module is a cutter module.

6. The apparatus of claim 1, wherein:

if the second time interval is greater than the first interval, then the second corresponding value is greater than the third corresponding value.

7. The apparatus of claim 6, wherein:

said second corresponding value is greater than said first corresponding value.

8. The apparatus of claim 7, wherein:

said apparatus is an inserter and said first module is a slitter module.

9. The apparatus of claim 8, wherein:

said second module is a cutter module.

* * * * *